Sept. 22, 1970 D. V. HARTZELL 3,529,455

KEY RECORDING DEVICE

Filed June 17, 1968 6 Sheets-Sheet 1

Inventor:
Donald V Hartzell,
By Hume, Clement, Hume & Lee
attys

Sept. 22, 1970 D. V. HARTZELL 3,529,455

KEY RECORDING DEVICE

Filed June 17, 1968 6 Sheets-Sheet 2

Inventor:
Donald V. Hartzell,
By Hume, Clement, Hume & Lee
attys.

Inventor:
Donald V. Hartzell
By Hume, Clement, Hume & Lee
Attys.

Sept. 22, 1970 D. V. HARTZELL 3,529,455

KEY RECORDING DEVICE

Filed June 17, 1968 6 Sheets-Sheet 4

Inventor:
Donald V. Hartzell
By Hume, Clement, Hume & Lee
Attys.

Sept. 22, 1970 D. V. HARTZELL 3,529,455

KEY RECORDING DEVICE

Filed June 17, 1968 6 Sheets-Sheet 5

Inventor:
Donald V. Hartzell
By Hume, Clement, Hume & Lee Attys.

KEY RECORDING DEVICE

Filed June 17, 1968

Inventor:
Donald V. Hartzell
By Hume, Clement, Hume & Lee
Attys

United States Patent Office 3,529,455
Patented Sept. 22, 1970

3,529,455
KEY RECORDING DEVICE

Donald V. Hartzell, Star Rte., Box 11,
New Castle, Colo. 81647

Filed June 17, 1968, Ser. No. 737,735
Int. Cl. E05b 9/02, 39/04
U.S. Cl. 70—355 20 Claims

ABSTRACT OF THE DISCLOSURE

A key recording device for registering the identity of each of a plurality of operating keys and for controlling access to a selected facility. The device includes a series of abutment members independently rotatable from a first selected position, and may include interlocking means which assures the desired sequence of operations. The operating key usable in the device is insertable in the device and adapted for rotation between a locked and an unlocked position, and has a series of detents engageable with said abutment members to move the members from their first position to preselected second positions as the key rotates to its unlocked position. Indicia registering means are provided to record indicia corresponding to the second positions of the abutment members to thereby identify the operating key. Security locking means may also be provided on the key and recording device to control access to the device.

This is a continuation-in-part of application Ser. No. 538,272, filed Mar. 29, 1966 and now abandoned.

This invention generally relates to a key recording device, and more particularly relates to an improved key-operated recording device which is readily adaptable to control the access to and the distribution of bulk materials such as petroleum.

As a result of many competitive factors, there is presently a pressing need in the bulk product industry, which distributes large metered quantities of liquid and solid materials, for equipment which would permit the product to be distributed more rapidly and efficiently at a substantially reduced labor cost, while still maintaining accurate product invoicing and inventory control. For instance, this need is particularly prevalent in the petroleum industry, which necessarily must distribute its petroleum products in great quantity from terminals and bulk plants.

To satisfy this need, there have thus been many prior attempts by the bulk product industry to develop automation equipment which will permit bulk products such as petroleum to be distributed quickly and efficiently at a reduced labor cost. More specifically, the petroleum and other bulk distribution industries have heretofore attempted to design product distribution equipment which automatically and efficiently performs the operations of controlling access to the product, identifying authorized customers, totalizing the volume or amount of the product withdrawn by the particular identified customer, and providing accurate records of the amount of product distributed to the recipient during each transaction.

With regard to the early development of this type of control equipment, one of the first attempts to provide product distribution control in the petroleum industry comprised the positioning of a key lock at the petroleum loading rack. This lock could be opened only with a key provided by the distributor to the authorized customer. In such prior key lock systems, the operation of the lock by the key was designed to actuate a totalizer or counting device which was assigned to the particular authorized customer, and to simultaneously actuate a valve switch which would permit the customer to withdraw the product from the distribution facility.

By using such above-described mechanical devices it was possible to limit the use of the distribution facilities to authorized customers possessing the operating key, and to record on the totalizer the amount of product withdrawn by each customer. However, such prior key-lock systems were found to be disadvantageous in many respects. For instance, when such a system was used the total amount of product withdrawn from the facility by each authorized customer could be recorded, but each transaction could not be segregated, and the particular customer's agent, such as the tank truck driver who made the withdrawal, could not be easily identified. Furthermore, such a system required at least one key and lock for each authorized customer. Expensive duplication of control equipment was thus necessary with these prior key lock systems in order that more than one authorized customer could be serviced by each distribution unit. In the petroleum industry for example, the expense and physical conditions of most distribution facilities have heretofore limited the use of duplicate key lock equipment to a maximum of about twenty-authorized key lock customers per pumping unit.

Subsequent attempts to develop automatic equipment for controlling the distribution of bulk materials such as petroleum have resulted mainly in complicated and expensive electric or electronic systems which often required the installation of computerized equipment. Although such highly sophisticated distribution control systems obviously can be designed to read out and record the desired invoicing and inventory control data, and have met with success in large distribution facilities such as petroleum terminals, such systems also possess many disadvantages. Regardless of the degree of sophication of such computerized control systems, for instance, a coded device such as a key, punch card or digit dial is still required to control access to the product and actuate indicia which identifies the recipient. Many of these installations thus also call for duplication of equipment such as a separate key operated lock for each customer. Moreover, this more advanced control equipment has been found to be unnecessary and extremely uneconomical in most small and medium sized bulk distribution facilities.

The prime object of this invention is therefore to provide an improved key recording device which is readily adaptable to control the access to and the distribution of bulk products.

Another object of this invention is to provide a key-operated recording device adaptable for controlling the distribution of bulk products which will provide the necessary degree of product control and information while eliminating the need for duplicate equipment at the distribution facility.

A further object of this invention is to provide an improved key-operated recording device for controlling the distribution of bulk products or materials which permits authorized access to the product by a great number of customers, and which is adaptable to register indicia identifying each distribution transaction and each customer, without duplication of product control equipment at the distribution facility.

A still further object of this invention is to provide a key recording device which is compact in design, which includes a minimum number of operating parts, and which may be readily installed in existing product distribution facilities without interfering with the other functions or features of the facility.

Additional objects and features of this invention will become apparent from a description of an embodiment thereof employed in a petroleum distribution facility, as illustrated in the accompanying drawings.

Referring generally to these drawings, it will be seen that this invention contemplates the provision of an improved key recording device which is mechanically actuated by a novel form of operating key. Moreover, this invention contemplates the provision of a key device which may be actuated by any one of a plurality of operating keys, and which registers indicia positively identifying the particular key being used. Thus, a single key recording device in accordance with this invention can be employed to control the distribution of bulk products to a great number of customers by providing each customer's agent, such as the tank truck driver receiving the product, with a distinctive operating key. Moreover, the key device can incorporate security locking means so that the device controls the access to the product being distributed as well as identifying the various operating keys.

Figure 1:
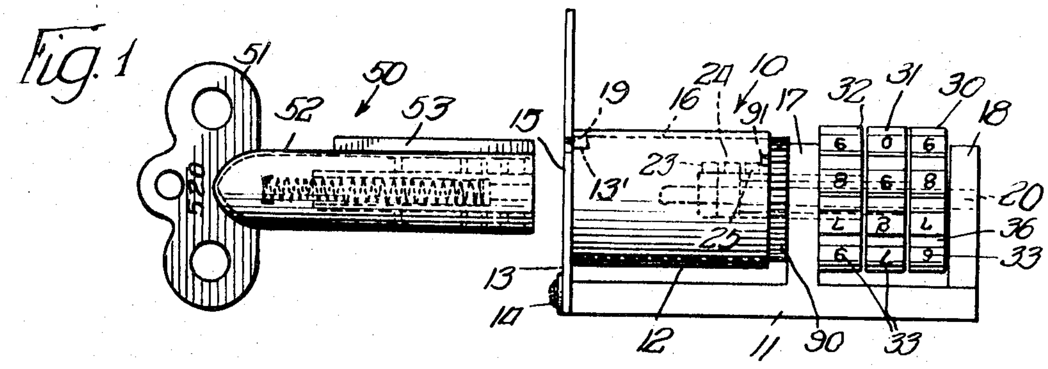
FIG. 1 is an elevational view of one embodiment of the key recording device and operating key constructed in accordance with this invention.

Referring to FIG. 1 in more detail, one embodiment of the key recording device according to this invention is generally indicated by the reference numeral 10, and one embodiment of the operating key is indicated by the reference numeral 50. This key lock 10 includes a cylindrical housing 12, supported by the frame structure 11 and the face plate 13, defining a cylindrical key barrel 16. In this embodiment, the housing 12 is welded or otherwise secured to the face plate 13 in alignment with an aperture 15 in the face plate so that the key barrel 16 may readily receive the cylindrical operating key 50. A suitable fastener such as screw 14 is employed to removably fix the face plate 13 and the attached housing 12 to the frame structure 11. The screw 14 thus permits the key device to be readily disassembled for inspection or repair.

Figures 5, 6, 7:
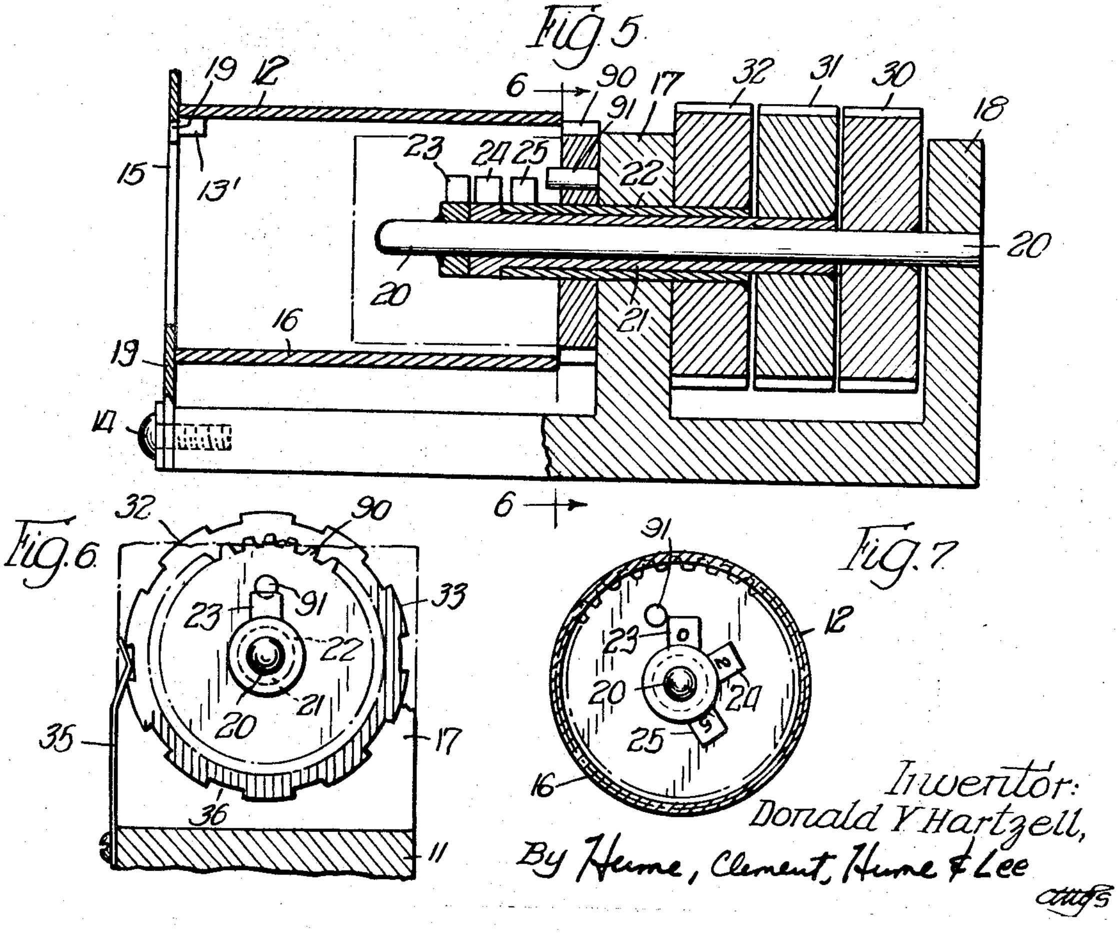
FIG. 5 is an enlarged fragmentary elevational view in section of the embodiment of the key recording device as shown in FIG. 1.
FIG. 6 is a cross-sectional view taken along the line 6—6 of FIG. 5, showing one embodiment of the key device in its initial locked position.
FIG. 7 is a fragmentary view of the device as illustrated in FIG. 6, showing the device in its second unlocked position.

As further illustrated in FIGS. 1 and 5, the key recording device 10 also includes a key shaft 20 which is rotatably supported on the frame 11 by the spaced upstanding members 17 and 18. This key shaft 20 in accordance with this invention is extended axially within one end of the key barrel 16 so that it will project into the interior portion of the operating key 50 when the key is inserted into the barrel, as described further hereinbelow. In addition, a set of telescoped sleeves 21 and 22 are mounted around this key shaft 20 in a manner which permits the sleeves to rotate with respect to each other and with respect to the shaft. The shaft 20 and the sleeves 21 and 22 are fixed from axial movement, but are thus free to rotate independently within the key barrel 16.

The enlarged view as shown in FIG. 5 illustrates that the key recording device 10 is also provided with a series of abutment tabs 23, 24 and 25 positioned within the key barrel 16 in a longitudinally spaced relationship. Further, these tabs 23, 24 and 25 are extended transversely with respect to the axis of barrel 16, and are secured to the shaft 20, the sleeve 21 and the sleeve 22, respectively. By this arrangement, these abutment tabs are separately joined to the independently rotatable shaft and sleeves, and are likewise independently rotatable within the key barrel 16. The tabs 23, 24 and 25 also extend within the interior portion of the operating key 50 when the key is inserted into the key barrel 16, and, as explained further hereinafter, engage with and are rotated by the key 50 during the operation of the key device.

From the above description it will be apparent that each of the abutment tabs 23, 24 and 25 can be independently rotated within barrel 16 by the operating key 50 from a first known position such as shown in FIG. 6, to a multitude of preselected second positions, such as shown in FIG. 7. Thus, the key device 10 can be provided with means which registers and records indicia corresponding to the respective second positions of the tabs 23, 24 and 25, thereby identifying the particular key 50 used to move each tab to its second position.

In this connection, the preferred embodiment of this invention includes registering means in the form of a series of recording dials or discs 30, 31 and 32, as illustrated in FIGS. 1 and 5. These discs are rotatably mounted about the key shaft 20 between the frame members 17 and 18, and the periphery of each disc is provided with suitable printing symbols such as numerals 33. FIGS. 1 and 5 further illustrate that these discs 30, 31 and 32 are fixed to the shaft 20, sleeve 21 and sleeve 22, respectively. Each recording disc thereby rotates in direct response to the rotation of the tab 23, 24 or 25 to which it is connected. The movement of each of the tabs 23, 24 and 25 from a first preselected position thereby results in a corresponding change in position of the numerals 33 on the periphery of each of the recording discs.

In the illustrated embodiment, the numerals 33 on the periphery of the discs 30, 31 and 32 comprise the series zero through nine, and the discs have been arranged so that their zero positions are adjacent each other when the abutment tabs 23, 24 and 25 are initially aligned radially above the key shaft 20, as illustrated in FIG. 6. It is preferred that the discs 30, 31 and 32 are further arranged so that this initial alignment of the tabs 23, 24 and 25 also places the zero numerals of each disc radially above the key shaft 20. This arrangement greatly facilitates the printing and recording of the indicia registered by this device, as explained further hereinafter. FIG. 6 also illustrates that this embodiment of the key device 10 also includes a spring detent 35 which engages one of a series of grooves 36 in each of the discs 30, 31 and 32 to releasably retain the discs in their proper positions.

It will be apparent from the above description that each of the illustrated discs 30, 31, and 32 can register ten different positions, including the zero position. Thus, with the series of three discs, the recording device can be utilized to indicate a combination of one thousand different second positions for the discs 30, 31, and 32 and their associated abutment tabs 23, 24, and 25. The key device 10 in this embodiment accordingly can receive and identify any one of one thousand operating keys used to rotate these abutment tabs and recording discs to various preselected second positions. Of course, the key recording device as described above could be readily modified by one skilled in the art to identify more or fewer keys, or could be combined with suitable electric or electronic indicia registering devices, without departing from this invention.

The construction of one embodiment of the operating key 50 employed to actuate the key device 10 in accordance with this invention will now be described with reference to FIGS. 1 through 4 of the drawings. As seen from FIG. 1, the key 50 comprises a handle portion 51 and a cylindrical body portion 52. This body portion 52 of the key 50 is dimensioned for insertion into the key barrel 16 through the face plate aperture 15, and is further dimensioned for positioning over the key shaft 20 and the abutment tabs 23, 24, and 25. The key body 52 is also provided with a spline 53 engageable with the keyway 19 on the key device 10, and further engageable with a stop member 13' on the face plate 13. Thus, the spline 53 and the keyway 19 assure that the key 50 will be inserted into the barrel 16 in the desired initial position, and prevent the key 50 from rotating until it is in the proper longitudinal position within the barrel 16. The spline 53 and the face plate 13 will also engage and prevent the key 50 from being removed from the barrel 16 if the key 50 is rotated out of its initial locked position. The stop 13' operates to limit the rotation of the key 50 within the barrel 16 to rotation through a predetermined arc.

Figures 2, 3, 4:
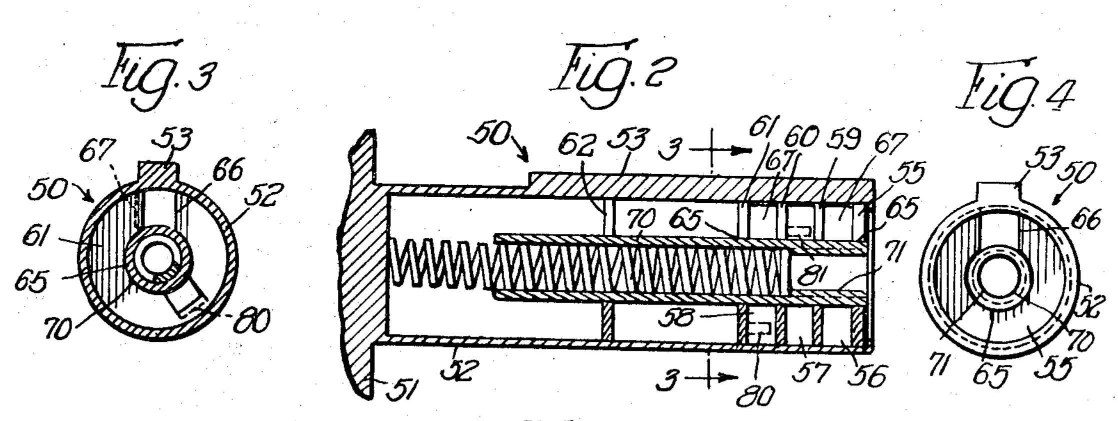
FIG. 2 is a fragmentary elevational view in section of the embodiment of the operating key illustrated in FIG. 1.
FIG. 3 is a cross-sectional view of the key taken along the line 3—3 of FIG. 2.
FIG. 4 is an end view of the key shown in FIG. 2.

As seen from FIGS. 2 and 4, the outer end of the key body 52 is provided with a protective washer member 55, and the interior of the body 52 is transversely divided into a series of longitudinally spaced compartments 56, 57, and 58 by similar washer members 59, 60, and 61. In addition, the spaced washers 55, 59, 60, and 61 include aligned apertures 65 which permit the key shaft 20 and the sleeves 21 and 22 to extend into the interior of the key, and further include aligned vertical slots 66 which provide clearance for the aligned tabs 23, 24, and 25. In this embodiment, the slots 66 are formed in the washers 59, 60, and 61 by cutting each washer and folding the cut portion 67 in a direction transverse to the washer body. As shown in FIGS. 2 and 3, such a construction permits the folded portions 67 to function as spacers which maintain the washers 59, 60, and 61 in the desired position within the key body 52. As apparent from FIGS. 2–4, the cut and folded portions 67 of the washers 59, 60 and 61 also will engage with the rotatable tabs 23, 24 and 25 when the key 50 is rotated in a counterclockwise direction within the housing 12. Accordingly, the portions 67 on the key 50 will function to return the tabs 23, 24 and 25 to their original aligned positions as shown in FIG. 6, from their second positions, such as shown in FIG. 7, when the key is rotated counterclockwise.

FIGS. 2 and 3 further illustrate that the key body 52 in this embodiment is provided with a spring-biased plunger 70 which slides within the aligned apertures 65. An additional washer 62 is provided to support the rearward end of this plunger 70, and the forward end of the plunger is provided with a recess 71 which will receive the end of the key shaft 20. Thus, the plunger 70 will protectively cover the interior compartments 56, 57, and 58 of the key body 52 when the key is not in use, but will be retracted by the shaft 20 to expose these compartments when the key is inserted into the barrel 16.

According to this invention, the above-described washer members 55, 59, 60 and 61 are selectively spaced along the axis of the cylindrical key body 52 so that the spacing of the compartments 56, 57, and 58 defined thereby corresponds to hte spacing of the abutment tabs 23, 24, and 25 on the key device 10. These washers are further arranged so that the tabs 23, 24, and 25 will be freely received within the compartments 58, 57, and 56, respectively, when the key 50 is inserted into the key device 10. The tabs 23, 24, and 25 are thereby free to slide or rotate within their respective compartments when the key 50 is rotated through the above-mentioned predetermined arc.

In order to register identifying indicia, the operating key 50 in accordance with this invention is further provided with a series of longitudinally spaced detents which are engageable with the spaced tabs 23, 24, and 25 to rotate the tabs to preselected second positions when the key 50 is rotated through a predetermined arc. In this regard, FIG. 2 illusrates that the compartment 58 is provided with a detent 80, and the adjacent compartment 57 is provided with a detent 81. In this embodiment, the detents 80 and 81 are formed by bending a cut portion of the adjacent washer member into the associated compartment, as shown in FIG. 3.

The detent 80 in this embodiment is prearranged about the internal periphery of the compartment 58 so that the rotation of key 50 operates through the detent 80 and the tab 23 to bring the numeral five on the recording disc 30 into a registering position radially above the key shaft 20. Similarly, the detent 81 is arranged within compartment 57 so that it operates upon rotation of the key 50 to bring the numeral two on the recording disc 31 into a registering position directly above the key shaft 20. In this embodiment, the last compartment 56 does not include a detent member. Hence, the tab 25 remains stationary when the key 50 is rotated, and the associated recording disc 32 will remain in the initial zero registering position. These preselected second positions for the tabs 23, 24, and 25 are illustrated in FIG. 7.

As a result of the above-described construction, the rotation of the operating key 50 through an arc determined by the location of the stop 13' will rotate the recording discs 30, 31 and 32 from the initial position, as shown in FIGS. 1, 3, and 6, to a second position which brings the numerals five, two, and zero, respectively, into registering position above the key shaft 20. Accordingly, the key recording device 10 identifies the operating key 50 by registering the number "520" when the key 50 is employed to actuate the key recording device.

Of course, additional operating keys can be constructed in accordance with this invention in which the detents within the compartments 56, 57, and 58 are arranged in different circumferential positions than the illustrated detents 80 and 81. Each of such keys would thus rotate, the tabs 23, 24, and 25 of the key device 10 into different selected second positions, and thereby register indicia which corresponds to and identifies the particular operating key employed. In the illustrated embodiment, wherein each of the recording discs 30, 31, and 32 includes ten printing symbols (zero through nine), the detents within compartments 56, 57, and 58 of the key 50 can be readily positioned around the internal circumference of the compartments to move the discs 30, 31, and 32 into one thousand different registering positions, including the zero position. Thus, the key device 10 is capable of identifying up to one thousand different operating keys.

As seen in FIGS. 1 and 5, the key device 10 also includes a locking gear 90 which is rotatably mounted around the outer sleeve 22 and the key shaft 20. The gear 90 is positioned at the inner end of the key barrel 16, and is provided with a pin 91 which projects inwardly into the key barrel 16. In addition, the gear 90 is mounted about the sleeve 22 so that the pin 91 is alignable with the tabs 23, 24, and 25 in the initial position as shown in FIGS. 5 and 6. The pin 91 will thus engage with the operating key 50 within the slot 66 when the key is initially inserted into the key barrel 16. The engagement between the key 50 and the pin 91 will thereby cause the gear 90 to rotate when the key 50 is rotated within the barrel 16. As explained further hereinafter, if the gear 90 is restrained from rotating by security locking means, the pin 91 will prevent the key 50 from rotating from the intial locked position within the barrel 16, unless the key 50 is provided with means adapted to release such security locking means. As also explained further hereinafter, the locking gear 90 can therefore be connected with a suitable interlocking system which assists in controlling the access to the product being distributed and the recording of the necessary distribution data.

Figures 8, 9, 10:
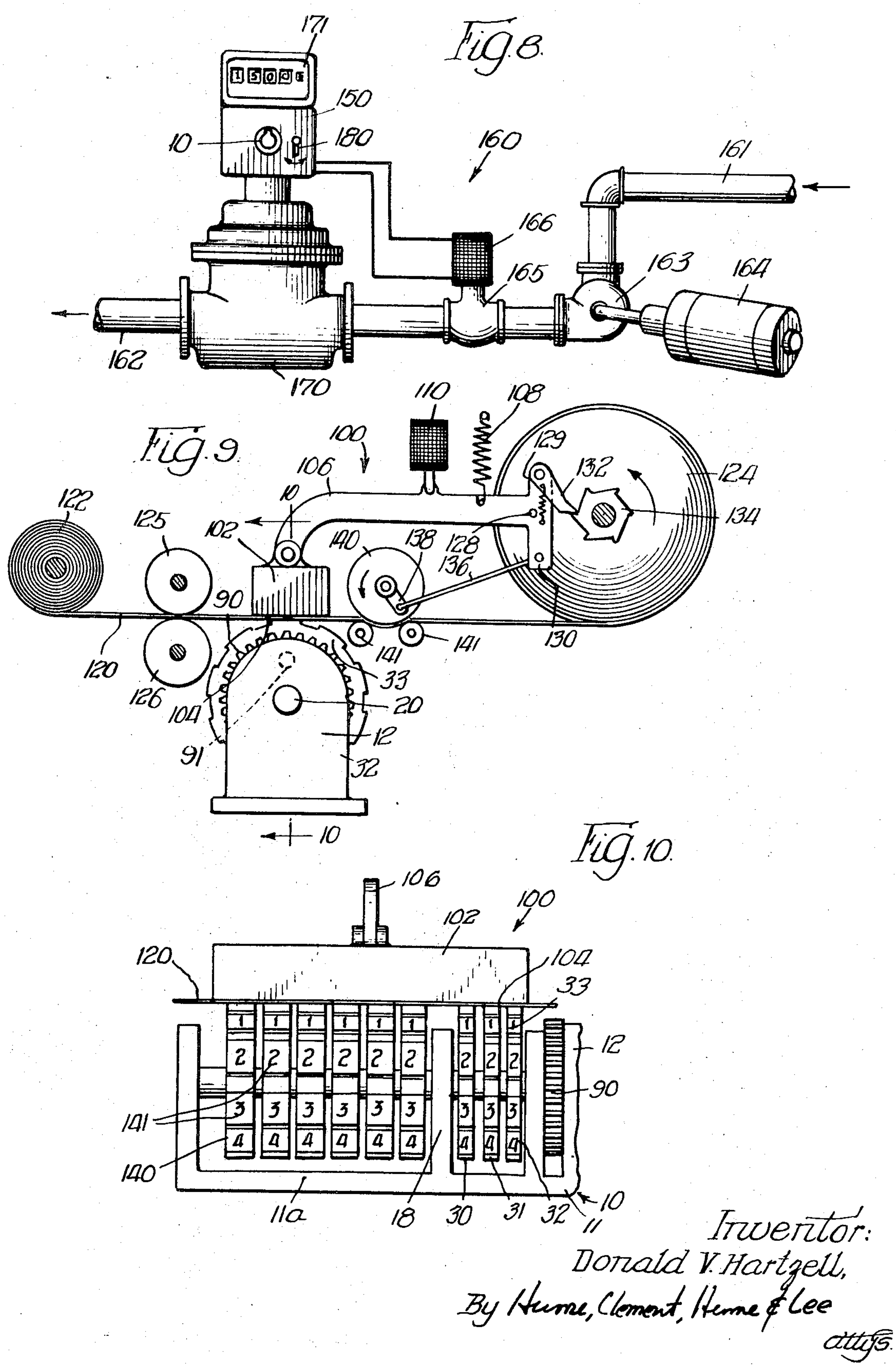
FIG. 8 is a schematic view of the key recording device in accordance with this invention shown in place at a typical petroleum distribution facility.
FIG. 9 is an elevational view of one form of data recording system which may be incorporated in the key-operated device in accordance with this invention.
FIG. 10 is a cross-sectional view taken along the line 10—10 in FIG. 9.

As seen from FIGS. 9 and 10, the key device 10 can be readily provided with a recording or printing system to provide a permanent record of the key-identifying indicia, one form of which is indicated generally by the reference numeral 100. The printing system 100 is also arranged to provide printed data of the distribution transactions in which each of a plurality of operating keys, such as key 50, is employed to actuate the key device 10. By this arrangement, the printing system 100 segregates the distribution transactions and identifies the operating key used in each transaction. One key device such as key device 10 can therefore service a large number of authorized customers, and the need for duplicate control equipment is eliminated.

Referring to FIGS. 9 and 10 in more detail, the printing system 100 includes a printing platen 102 having a flat printing surface 104. The platen 102 is movably mounted on a crank arm 106 so that the printing surface 104 is positioned radially above the shaft 20 of the key device 10. The platen 102 can thus move downwardly toward the numerals 33 on the key device recording discs 30, 31, and 32, when the numerals 33 are in their registering positions above the key shaft 20. As seen in FIG. 9, a suitable spring 108 urges the crank arm 106 and the attached platen 102 upwardly away from engagement with the key recording discs 30, 31, and 32. Similarly, a solenoid 110 is connected to the crank arm 106, and is arranged to drive the crank arm 106 and the platen 102 downwardly into a printing position when the soleoid 110 is energized.

In order to provide a permanent printed record, the printing system 100 includes a printing sheet or tape 120 suspended between the platen 102 and the key recording discs 30, 31, and 32. As illustrated in FIG. 9, the recording tape 120 is extended between a rotatable supply roll 122 and a rotatable take-up roll 124, and is maintained in the proper position between the platen 102 and the recording discs 30, 31, and 32 by being fed through idler rollers 125 and 126. The supply roll 122 will therefore provide the printing system 100 with a continuous supply of recording tape 120 upon which the distribution data can be printed.

The printing system 100 is further provided with means to advance the printing tape 120 from the supply roll 122 to the take-up roll 124 after the desired data has been printed on the tape 120. In this regard, the crank arm 106 is pivoted on a fixed shaft 128, and is provided with transverse eccentric arms 129 and 130. The eccentric arm 129 includes a spring-loaded pawl 132 which engages with a suitable ratchet 134 connected to the take-up roll 124, as seen in FIG. 9. In addition, the printing system 100 includes a feed roller 140 which is maintained in engagement with the tape 120 by a pair of rollers 141. The feed roller 140 is in turn provided with a ratchet mechanism 138 connected to the eccentric arm 130 by a pivoted connecting rod 136. This ratchet mechanism 138 of the feed roller 140 is designed to advance the feed roller 140 in a counterclockwise direction, as viewed in FIG. 9, when the connecting rod 136 is forced downwardly by the eccentric arm 130. By this arrangement, the movement of the crank arm 106 upwardly by the force of the spring 108 engages the pawl 132 with the ratchet 134, and advances the take-up roll 124 in a counterclockwise direction, as viewed in FIG. 9. The upward movement of the crank arm 106 will also force the connecting rod 136 downwardly and actuate the ratchet mechanism 138 to advance the feed roller 140 in a counterclockwise direction. Accordingly, the printing tape 120 is advanced to the right in FIG. 9 each time the crank arm 106 is returned from a downward printing position by the spring 108, and an unprinted portion of the tape 120 is positioned between the platen 102 and the recording discs 30, 31, and 32 after each actuation of the solenoid 110. The printing system 100 will thereby operate to imprint the key-identifying data of the recording discs 30, 31, and 32 onto the tape 120 each time the solenoid 110 is actuated to move the platen 102 downwardly.

As seen in FIG. 10, the printing system 100 also includes a second series of recording discs 140. These discs 140 are rotatably positioned adjacent the key device 10 on an extension **11*a* of the key device frame structure 11 in axial alignment with the recording discs 30, 31, and 32, and are provided with peripheral numerals 141. The discs 140 are further arranged so that their peripheries are in axial alignment with the peripheries of the key lock recording discs 30, 31, and 32 adjacent the recording tape 120. The series of discs 140 can then be connected to a suitable counting or totalizing device which moves the numerals 141 of the discs 140 into a registering position adjacent the tape 120 so as to indicate the numerical value of the amount or volume of product being distributed. The printing system 100 will therefore operate to imprint this distribution control data from the discs 140 onto the tape 120 in addition to the data of the discs 30, 31, and 32**, which identifies the operating key being employed.

Referring to FIG. 8, the above-described key device 10 and the printing system 100 comprises a compact distribution control unit which may be placed within a weather-proof protective cabinet 150, and incorporated in a loading rack for distributing petroleum products. The loading rack, generally indicated by reference numeral 160, is of standard construction and includes a petroleum inlet pipe 161 and an outlet pipe 162. The inlet pipe 161 is connected to a suitable petroleum storage tank or the like (not shown), and the outlet pipe 162 is connected to a suitable discharge nozzle (not shown). A pump 163 and a pump motor 164 operate to pump the petroleum product from the storage tank to the discharge nozzle during the distribution operation. The flow of the product from the inlet pipe 161 is controlled by a flow valve 165 which is remotely actuated by a solenoid 166.

This standard loading rack also includes a displacement meter 170 through which the petroleum product being distributed will flow before it is discharged from the outlet pipe 162. The displacement meter 170 is constructed in the well-known manner to measure the volume or gallonage of the product which is discharged when the control valve 165 is opened. The loading rack 160 is also provided with a counter or totalizer 171 connected in a well-known manner to the displacement meter 170 to provide a visual reading of the gallons of product being discharged. As seen in FIG. 8, in this embodiment the cabinet 150, containing the key device 10 and the printing system 100, is mounted on the displacement meter 170 adjacent the totalizer 171, and the discs 140 (FIG. 10) of the printing system 100 are connected to the displacement meter 170 in a manner well known to those skilled in the art. The series of discs 140 therefore moves in response to the volume of petroleum flowing through the meter 170, and permits indicia of the volume of flow to be recorded on the tape 120.

The cabinet 150 also includes an operating key or lever 180 which is interlocked with the locking gear 90 of the key device 10, as described further hereinbelow. This operating lever 180 is also connected through suitable electrical switching devices (not shown) to the flow valve control solenoid 166, and the printing system solenoid 110. The switches are designed so that the movement of the operating lever 180 will actuate the solenoid 110, and cause the printing system 100 to record distribution data on the printing tape 120. The switches are also suitably arranged so that the operating lever 180 will function to open or close the flow control valve 165.

To begin the operation of the petroleum loading rack 160, the authoriezd customer such as a tank truck driver inserts the operating key 50 into the key lock 10. During this insertion the end of the key shaft 20 will depress the key plunger 70 and permit the key 50 to be extended over the aligned tabs 23, 24, and 25 of the key device 10. When the key 50 is fully inserted into the key device 10, the spline 53 will be disengaged from the keyway 19, and the key will be inengagement with the pin 91 on the locking gear 90. In addition, the insertion of the key 50 into the key device 10 positions the aligned tabs 23, 24, and 25 within spaced key compartments 58, 57, and 56, respectively. The operating key 50 can then be rotated within the key barrel 16 through a predetermined arc to an unlocked position, where the spline 53 of the key engages with the stop 13'. The stop 13' is preferably positioned so that the key 50 is rotatable through a substantial arc from the locked position to the unlocked position. The key 50 is thereby capable of moving each of the tabs 23, 24, and 25 into a plurality of preselected second positions during the operation of key device 10. This predetermined arc is preferably in the two hundred seventy to three hundred sixty degree range, and is illustrated in FIG. 7 as being approximately three hundred forty-five degrees.

As described hereinabove, the rotation of the key 50 within the key barrel 16 to this unlocked position brings the detents 80 and 81 into engagement with the tabs 23 and 24, and rotates each of the tabs 23 and 24 from an initial aligned position, as shown in FIG. 6, to a second preselected position, as shown in FIG. 7. The rotation of the key 50 will not move the tab 25 from the initial position as shown in FIG. 6, since the compartment 56 of the key 50 contains no detent member. The rotation of the key 50 through a predetermined arc thus functions to rotate the recording discs 30 and 31 to bring the key-identifying symbols five and two, respectively, into registering position directly above the key shaft 20. The spring 35 (FIG. 6) will prevent the disc 32 from rotating with the discs 30 and 31, so that the zero symbol on the disc 32 will remain in a registering position above the key shaft 20. The operation of the key lock 10 by the operating key 50 thereby registers the symbols "520" which identify the particular operating key being employed.

The rotation of the key 50 also functions to rotate the locking gear 90 through a predetermined arc due to the engagement between the key 50, and the projecting pin 91. The gear 90 can therefore be interlocked with the operating lever 180 (FIG. 8) by suitable means which restrains the operating lever 180 from movement until the key 50 and the gear 90 have been fully rotated. By such an interlocking connection with the gear 90, the loading rack 160 is arranged to prevent distribution of the petroleum product until after an authorized customer has inserted and rotated his operating key 50 to an unlocked position within the key lock 10.

With the operating key 50 rotated to its unlocked position, the customer can then actuate the operating lever 180, such as by rotating the lever 180 in a clockwise direction as viewed in FIG. 8. Suitable switching devices, not shown, will then actuate the solenoid 110 of the printing system 100, as shown in FIG. 9, to drive the printing platen 102 downwardly and force the printing tape 120 against the symbols 33 on the recording discs 30, 31, and 32. As seen in FIG. 10, the platen 102 also brings the tape 120 into engagement with the printing numerals 141 on the series of recording discs 140. The actuation of the operating lever 180 thereby prints a permanent record of the key-identifying symbols "520," and symbols 141 representative of the initial gallonage reading, onto the tape 120. After this printing operation is completed, the spring 108 will return the printing platen 102 upwardly from its printing position shown in FIG. 9, and will advance the printing tape 120 as described above.

The operating lever 180 can be similarly devised by those skilled in the art to actuate the valve control solenoid 166 and open the flow valve 165 immediately after the printing operation is completed. The motorized pump 163 will then pump the petroleum product through the displacement meter 170 and the outlet pipe 162, and discharge the petroleum into the customer's tank truck or the like. The continuous flow of petroleum through the displacement meter 170 actuates the visual totalizer 171 and the recording discs 140 so that the totalizer 171 and the discs 140 indicate the gallons of the product being distributed.

When the authorized customer has withdrawn the desired amount of petroleum from the loading rack 160, the operating lever 180 is returned to its initial position, as shown in FIG. 8. Suitable switching devices will then actuate the solenoid 166 to shut the flow valve 165 and stop the distribution of the petroleum product. The return of the operating lever 180 to its initial position will also activate the printing solenoid 110 and once again bring the printing platen 102 downwardly against the tape 120. The tape 120 will then include a printed record of the key-identifying indicia "520" and of the final gallonage reading registered by the discs 140.

The interlock between the gear 90 of the key device 10 and the operating lever 180 is preferably arranged to prevent the rotation of the key from its unlocked position to its original position, and thus prevent the removal of the key 50, until after the operating lever 180 is returned to its initial position. By this arrangement, the authorized customer receiving the petroleum product is required to record before and after gallonage readings, and to record indicia identifying its operating key, in order to operate the loading rack 160.

As apparent from the drawings, after the operating lever 180 is returned to its initial position, the key 50 can be rotated from the unlocked position to the original position, where the spline 53 on the key is aligned with the keyway 19. This return of the key 50 to its original position also causes the portions 67 on the key to engage with the tabs 23, 24 and 25 and thereby return the tabs from their second positions to their original aligned position. The key 50 can then be withdrawn from the housing 12, and the key device 10 is prepared for another operating cycle, to be actuated by the same or a different key.

The operation of the loading rack 160 as described above will be the same with any of the plurality of operating keys such as key 50. Accordingly, the key recording device 10 embodying the features of this invention operates to provide the petroleum distributor with control data which identifies the customer and the product volume involved in each distribution transaction. The construction of the key recording device 10 and the operating key 50 in accordance with this invention also permits a great number of customers to be serviced by one key device installation, thereby eliminating the need for any duplicate data control equipment at the loading rack.

Referring now to FIGS. 17 through 20, the preferred form of system for interlocking the locking gear 90 with the separate operating key or lever 180, as mentioned hereinabove, is generally indicated by the reference numeral 300. This interlocking system 300 is positioned within the cabinet 150, and operates to restrain the movement of the lever 180 until the operating key 50 and the locking gear 90 have been rotated through a predetermined arc. The loading rack 160 is thereby provided with means to prevent the distribution of the product until after an authorized customer has inserted and rotated the operating key 50 to an unlocked position within the key device 10. By this arrangement, no product will be distributed until the device is in position for registering the indicia identifying the key 50 being used. The interlocking system 300 further prevents the key 50 from being removed from the device 10 until the cycle of operation for the device has been completed, and a final reading of the amount or volume of product which was distributed is recorded.

Figure 17:
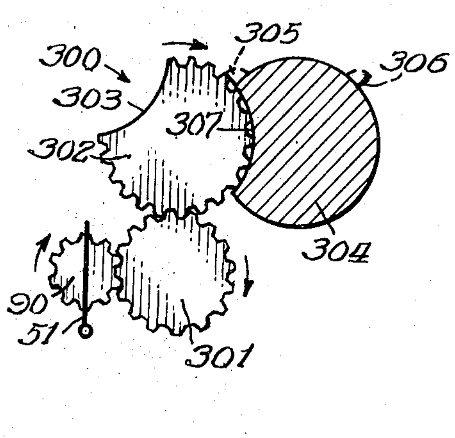
FIG. 17 is a schematic illustration of an interlocking mechanism which may be incorporated in the device in accordance with this invention to assure that the operations of the device are performed in the desired sequence.

Accordingly, as schematically illustrated in FIGS. 17–20, the interlocking system 300 includes an idler gear 301 which is rotatably mounted within the cabinet 150 so that it will mesh with the locking gear 90. The system 300 further includes a rotatable driven gear 302 which is mounted within the cabinet 150 in meshing engagement with the idler gear 301. The major portion of the periphery of driven gear 302 includes teeth engageable with the corresponding teeth on the idler gear 301. However, as illustrated in FIG. 17, a sector of the gear 302 includes a concave arcuate recess 303, preferably circular, which is adapted to receive a segment of the periphery of a locking disc 304. This locking disc 304 is mounted closely adjacent to the gear 302, and is operably connected by suitable means such as a shaft or the like (not shown) to the operating lever 180 (FIG. 8). The disc 304 need not include gear teeth on its periphery, but many include peripheral stop means 305 and 306, as illustrated in phantom in FIG. 17–20. These stops limit the clockwise and counter-clockwise movement of the disc 304 within a predetermined arc. Alternatively, the stop means 305 and 306 may be eliminated from the periphery of the disc 304, and similar stop means may be provided on the shaft (not shown) upon which the disc 304 is mounted.

The disc 304, like the driven gear 302, includes an arcuate recess 307, preferably circular, adapted to receive the periphery of the adjacent driven gear 302, as fully illustrated in FIG. 17. In FIGS. 17–20, the position of the operating key 50 throughout the various phases of the operation of the interlocking system 300 is illustrated schematically by the key handle portion 51.

FIGS. 17–20 illustrate the successive stages of operation for the interlocking system 300. In the initial stage of the system 300, as illustrated in FIG. 17, the key 50 (handle 51) is positioned within the barrel 16 of the device 10, but has not been rotated from its original locked position. In this initial stage the driven gear 302 and locking disc 304 are arranged so that the gear 302 is positioned within the recess 307 on the disc 304. In this condition, the gear 302 will engage with the disc 304 and prevent the disc 304 and the associated operating lever 180 from being rotated.

Figure 18:
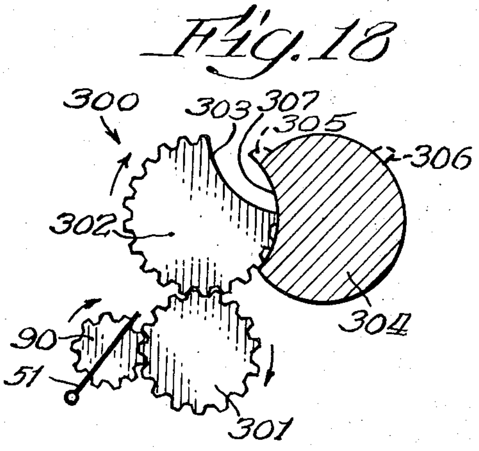
FIGS. 18 through 20 illustrate the interlocking mechanism as shown in FIG. 17 in successive stages of operation.

Thus, the distribution of the product cannot occur with the key 50 (handle 51) in its initial locked position. FIG. 18 illustrates an intermediate stage of operation of the system 300, where the operating key 50 (handle 51) has been rotated clockwise from its locked position, described above, toward its unlocked position. As seen in FIG. 18, the clockwise rotation of the key 50 (handle 51) likewise rotates the locking gear 90 in a clockwise direction, and in turn causes the idler gear 301 to rotate counter-clockwise. Through the idler gear 301, the gear 302 including the arcuate recess 303 is advanced in a clockwise direction, so that the recess 303 is advanced toward the adjacent locking disc 304. In this intermediate stage, a portion of gear 302 remains within the recess 307, and prevents any clockwise rotation of the disc 304 and the associated operating lever 180.

As the clockwise rotation of the operating key 50 (handle 51) is continued, the key eventually reaches its unlocked position, and the interlocking system 300 releases the locking disc 304. The gear ratio of the gears 90, 301 and 302 are designed so that the rotation of key 50 through a predetermined arc operates to rotate the gear 302 from the position shown in FIG. 17 to the position shown in FIGS. 19 and 20. Thus, when the key 50 (handle 51) reaches its unlocked position, the arcuate recesses 303 on the gear 302 is placed adjacent the locking disc 304. In this position, the arcuate recess 303 is arranged to receive the periphery of the disc 304, and the disc 304 can be rotated in a clockwise direction by the operating handle 180. By this arrangement, the operating handle 180 associated with the disc 304 can be activated only after the operating key 50 has been moved from the above-described locked position to its unlocked position, and the distribution of the product being controlled cannot begin until the indicia registering means described above is in position for indicating the identification of the key 50.

Figure 19:
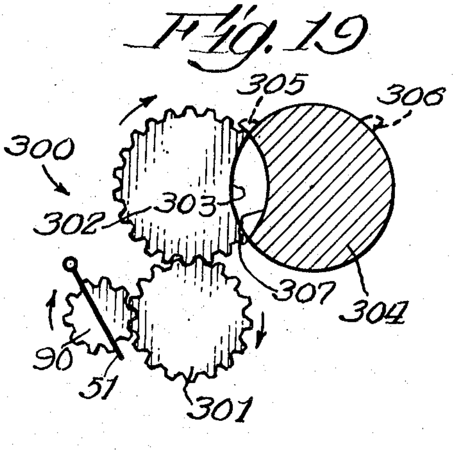
Figure 20:
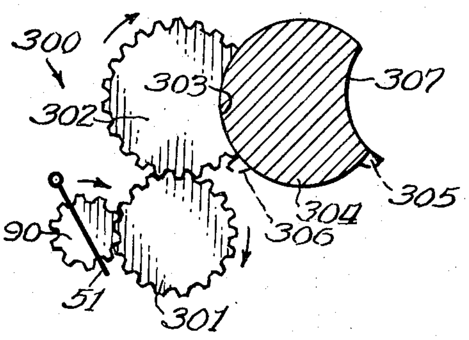

After the interlocking system 300 has assumed the position illustrated in FIG. 19, the handle 180 is actuated to rotate the disc 304 in a clockwise direction from the position shown in FIG. 19 to the position shown in FIG. 20. Further clockwise rotation of the disc 304 is precluded by the stop 306, or other suitable stop means. Such movement of the disc 304 to this final position, illustrated in FIG. 20 initiates the distribution of the product, and the printing of the indicia, as described above, and further positions a segment of the periphery of the disc 304 within the gear recess 303. The interlocking system 300 thus also functions to prevent movement of the operating key 50 from the unlocked to the locked position, and the withdrawal of the operating key from the device 10, until the handle 180 and the associated disc 304 have been returned to the original position illustrated in FIGS. 17 and 19.

As described hereinabove, the interlocking system 300 thereby prevents the movement of the operating lever 180 until the operating key 50 has been fully rotated so as to register indicia identifying the particular key. After the key 50 has been fully rotated, the lever 180 can be operated to actuate the switching devices for printing the indicia identifying the operating key 50 and for opening the flow control valve 165 to start the product flow. Further, after the desired amount of product has been withdrawn, the key 50 cannot be returned to its locked position or retracted from the system until the operating lever 180 has been returned to its initial position, as shown in FIGS. 8 and 17. This return movement of the lever 180 will actuate the solenoid 166 to shut the flow control of valve 165 and also will actuate the printing solenoid 110 for printing the final gallonage reading. After the final reading is taken and recorded in this manner, and the operating handle 180 has been rotated to position the associated disc 304 in its original position (FIGS. 17 and 19) the operating key 50 can be rotated counter-clockwise to its locked position, and removed from the device 10.

Figure 11:
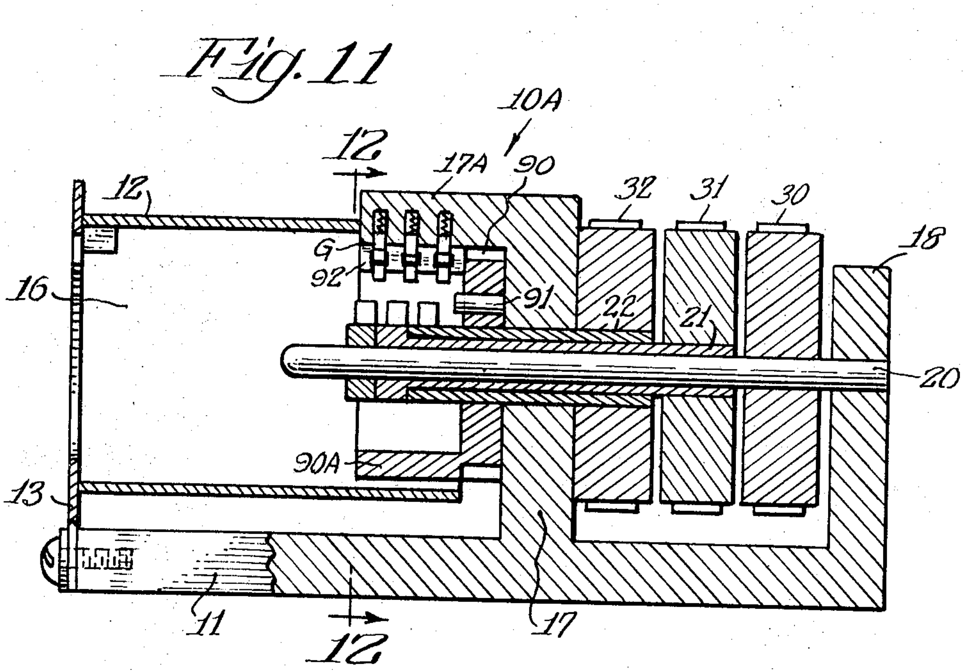
FIG. 11 is an enlarged fragmentary elevational view in section, similar to FIG. 5, showing a second embodiment of the key recording device in accordance with this invention wherein the device incorporates security locking means.
Figure 12:
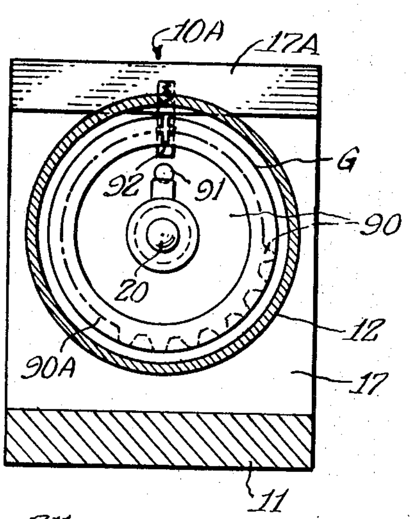
FIG. 12 is a cross-sectional view taken along the line 12—12 in FIG. 11.
Figure 13:
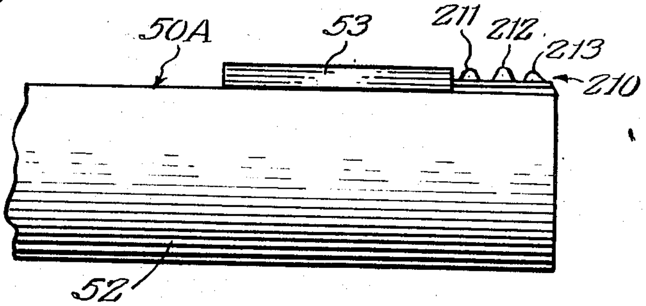
FIG. 13 is an elevational view of a second embodiment of the operating key in accordance with this invention which is modified to operate in cooperation with the embodiment of the key recording device as illustrated in FIGS. 11 and 12.

FIGS. 11–13 illustrate a second embodiment of the key device in accordance with this invention which incorporates security locking means for controlling access to the product being distributed. This modification of the recording device permits an operating key such as key 50 to perform both security and identification functions, and eliminates the need for a separate security key.

Figures 23, 24, 25:
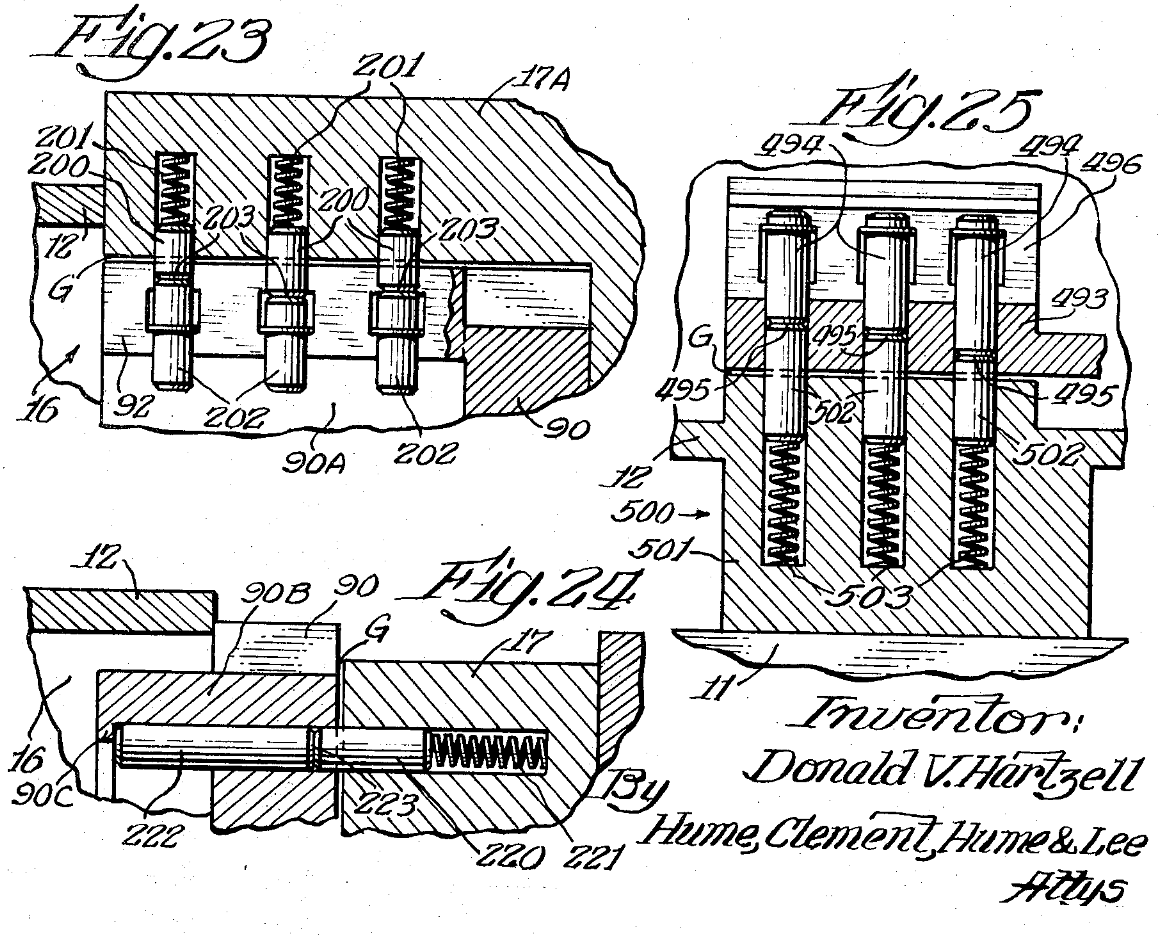
FIGS. 23, 24 and 25 are enlarged sectional views of the security locking means included in the key device illustrated in FIGS. 11, 14 and 21, respectively.

In FIGS. 11–13 the modified key device, generally indicated as 10A, includes many of the same components as included in the previously-described device 10. These similar components have been identified by the same reference numerals as set forth above with respect to the device 10. In the key device 10A, the frame member 17 (FIG. 5) has been modified to include a forwardly-extending upper flange portion 17A. As indicated in FIGS. 11, 12 and 23, this flange 17A of the frame 17 is provided with a plurality of recesses, each of which is provided with a movable locking pin 200. A preloaded compression spring 201 is also positioned within each of the recesses in the flange 17A to bias each of the locking pins 200 downwardly toward the interior of the key barrel 16. Suitable means, such as a retaining washer or the like, (FIG. 23) is provided to prevent the locking pins 200 from being withdrawn downwardly from the flange 17A, but are arranged so that the locking pins can be driven upwardly with ease.

In the modified key device 10A, as illustrated in FIGS. 11 and 12, the locking gear 90 (FIG. 5) is also modified to include a forward cylindrical portion 90A, which is spaced below the flange 17A by a gap "G." The outer diameter of the cylindrical portion 90A is selected to fit within the key barrel 16, and the inner diameter is dimensioned to receive the body 52 of an operating key 50A (FIG. 13). The portion 90A of the locking gear 90 also includes a plurality of holes which are arranged in the same pattern as the recesses provided in the frame flange 17A. A drive pin 202 is slidably mounted within each of these holes in the portion 90A and projects downwardly into the key barrel housing 16. Again, suitable retaining means such as a retaining washer (not shown) is provided to limit the downward movement of drive pins 202, and to retain the pins in the desired location within the holes in the portion 90A. As indicated in FIG. 11, the drive pins 202 are accordingly alignable with the locking pins 201, so that the upper ends 203 of the drive pins 202 are in abutting relationship with the pins 201 in the cylindrical portion 90A. The pins 200 and 202 thereby co-operate to define tumblers in a cylindrical-type lock.

As seen from FIG. 11, the compression springs 201 urge the abutting pins 200 and 202 downwardly when the holes in the gear portion 90A are aligned with the recesses in the frame flange 17A. The locking pins 200 thereby span the gap "G" between the flange 17A and the cylindrical portion 90A, and secure the cylindrical portion 90A and the associated locking gear 90, so that the gear 90 cannot be rotated with respect to the frame 17. Further, it is apparent from FIG. 11 that gear 90 can be released for rotation by compressing the springs 201 (upwardly in FIG. 11) with a sufficient force so that the ends 203 of pins 202 become aligned with the gap "G." With the pin ends 203 so aligned, the gear 90 and the cylindrical portion 90A can be rotated with respect to the frame 17 by applying a rotative force thereto, such as through an operating key engaged with the gear pin 91. When such rotation occurs, the outer periphery of the cylindrical portion 90A engages the locking pins 200 and retains the locking pins 200 retracted within the recesses in the flange 17A, until the pins 202 and 200 are again aligned.

By this arrangement, the key device 10A is provided with an effective security locking means which cannot be released without the use of a specially-designed operating key. In this regard, as shown in FIGS. 11 and 12, the cylindrical portion 90A of the locking gear 90 is provided with an axial keyway 92 which is adapted for receiving the blade of a specially-designed operating key, so that the above-described security locking means can be released.

FIG. 13 illustrates a specially-designed operating key 50A which is adapted to perform the key identification functions as described above with respect to key 50 and which, in addition, includes a blade portion 210 for releasing the security locking means provided in the key device 10A. The key-identifying structure of the key 50A is identical to the structure included in the key 50 previously described. As shown in FIG. 13, the blade 210 is aligned with the spline 53 on the key body 52, and is dimensioned so that it can be readily inserted within the axial keyway 92 in the cylindrical gear portion 90A. Further, the blade 210 includes projections 211, 212 and 213, of varying heighth, which are adapted to engage with and raise the drive pins 202. The various heighths of the projections 211–213 are coordinated with the length of the respective drive pins 202 so that when the modified key 50A is completely inserted within the key barrel 16 of the device 10A, the projections raise the drive pins 202 upwardly and align the pin ends 203 with the gap G.

Thus, the device 10A is provided with security locking means which can be released only by a specially-designed operating key such as the key 50A. Of course, it will be obvious to those skilled in the art that the heighth of the projections 211–213 and the length of the pins 200 and 202 can be varied to provide the device 10A with a great number of locking combinations. Once this tumbler-type lock is released by the key blade 210, the operation of the key device 10A can proceed in the same manner as described above with respect to the similar key device 10. The gear portion 90A will maintain the locking pins 200 in their retracted positions until the key 50A is turned back to its locked position, and the pins 200 and 202 are again aligned. When such alignment occurs, the springs 201 will force the locking pins 200 across the gap G (downwardly in FIG. 11) and thereby return the device 10A to its initial locked condition.

Figure 14:
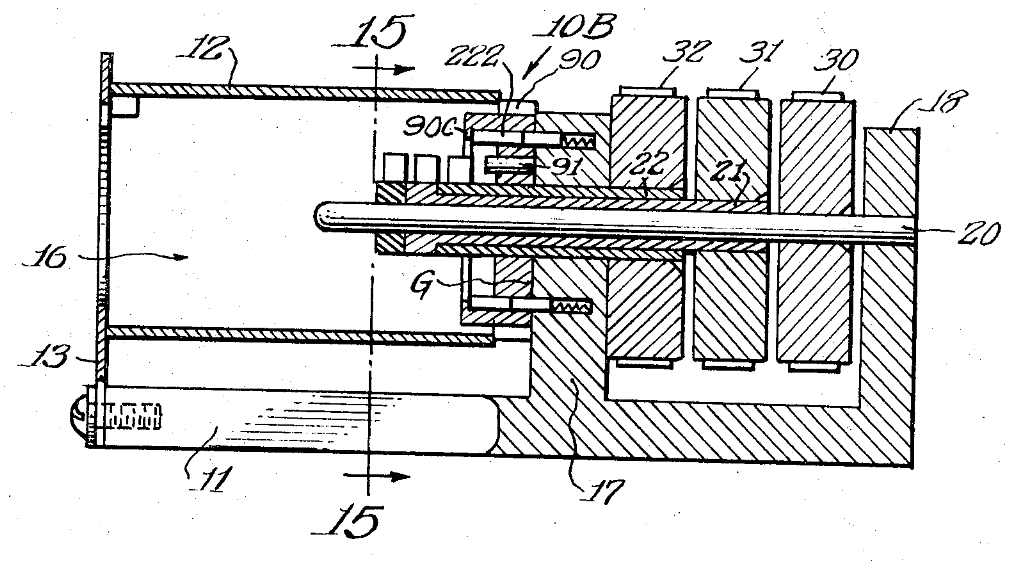
FIG. 14 is an enlarged fragmentary elevational view of a third embodiment of the key recording device incorporating a second form of security locking means.
Figures 15, 16:
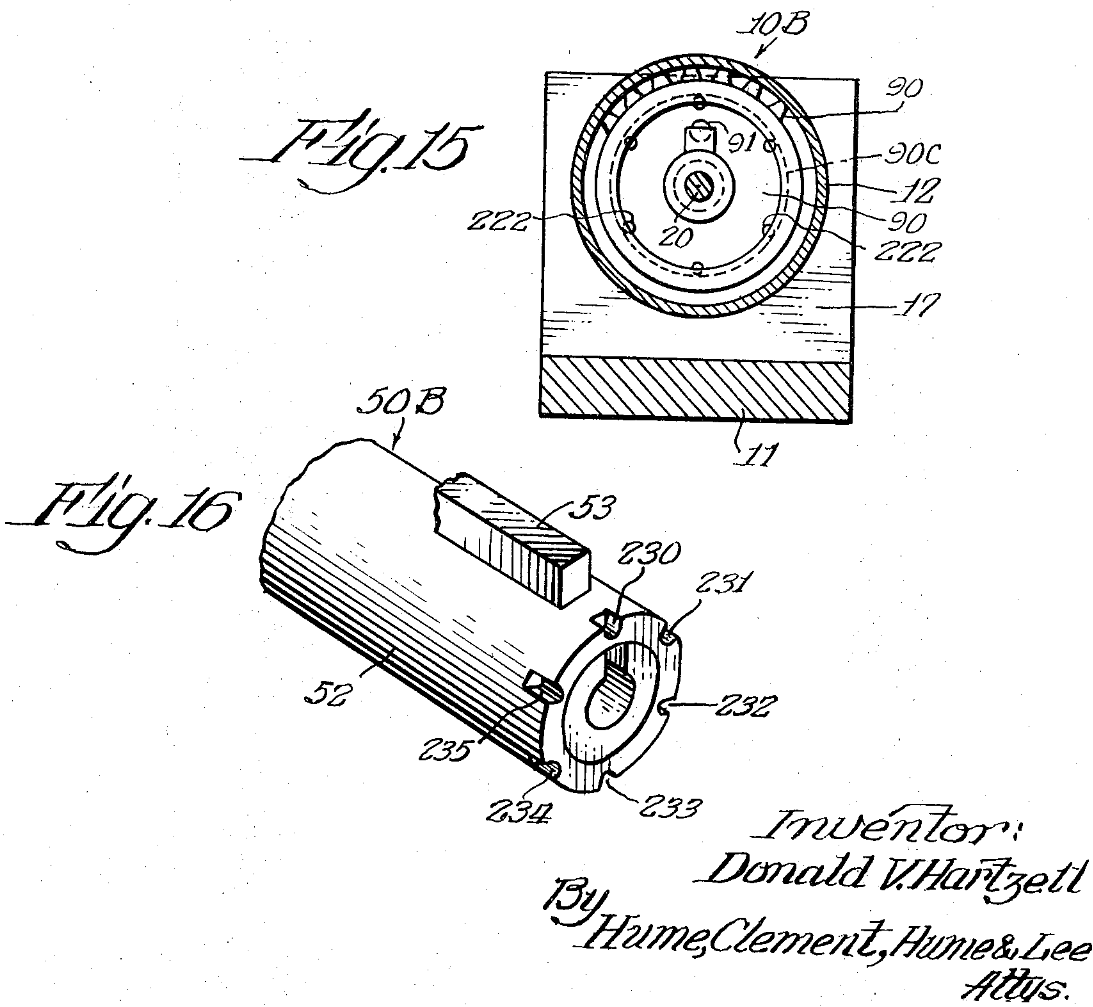
FIG. 15 is a cross-sectional view taken along the line 15—15 in FIG. 14.
FIG. 16 is a perspective view of a third embodiment of the operating key which incorporates modifications which permit the key to cooperate with the third embodiment of the key recording device illustrated in FIGS. 14 and 15.

A third embodiment of the key device in accordance with this invention is illustrated in FIGS. 14 and 15 of the drawings. In this third embodiment the device, generally indicated by the reference numeral 10B, is provided with security locking means as well as identification means, and operates in the same general manner as the above-described device 10A. However, the device 10B is provided with an axial tumbler lock in contrast to the cylindrical lock incorporated in device 10A.

To provide such an axial tumbler locking arrangement, the frame member 17 in the device 10B is provided with an array of equally spaced recesses, each of which includes a locking pin 220. Further, compression springs 221 are placed in the holes within the member 17 to bias the pins 220 outwardly toward the key barrel 16 (to the left in FIG. 14). A pattern of holes is similarly provided in the adjacent locking gear 90 to correspond with the pattern of recesses in frame 17, each of which is provided with a retractable drive pin 222. A circular flange portion 90B, provided on the gear 90, extends within the key barrel 16, and includes a depending lip 90C which is dimensioned to receive the forward end of the key body 52 (FIG. 16). As shown in FIG. 14, the lip 90C engages with a portion of the outer end of each drive pin 222 and thereby retains the drive pins within the holes in the gear 90.

In operation of the device 10B, the alignment of the pins 222 with the locking pins 220 permits the springs 221 to force the pins 220 forwardly in the barrel housing 16, across the gap G between the frame 17 and the gear 90. As shown in FIG. 14, the pins 220 will thereby effectively restrain the gear 90 from rotation, and will operate as security locking means for the device 10B. As in the above-described device 10A, the device 10B can be released only by retracting the locking pins 220 and the drive pins 222 (by moving the pins to the right in FIG. 14) so that the ends 223 of the drive pins 222 become aligned with the gap G. Then, with the pins 220 and 222 in such a position, an operating key, such as key 50B, can be engaged with the pin 91 and rotated within the barrel 16, to actuate the locking gear 90 in the above-described manner.

A modified operating key 50B, which is adapted to release the security locking means provided on the device 90B, is illustrated in FIG. 16 of the drawings. The key 50B is similar to the above-described operating key 50, and includes the same key-identifying structure. However, the key 50B has been modified to selectively engage with and retract the drive pins 222, so as to unlock the device 10B. In this regard, the spline 53 on the key 50B has been cut back, as indicated in FIG. 16, to provide clearance for the cylindrical flange 90B on the locking gear 90 (FIG. 14). Further, the forward peripheral edge of the key 50B is provided with a plurality of grooves 230–235 which are adapted to receive the plurality of drive pins 222 as the key 50B is fully inserted within the key barrel housing 16. When the key 50B is so inserted, the grooves 230–235 will forcibly depress the drive pins 222 until the ends 223 on the pins are aligned with the gap G. The key 50B then can be rotated to perform the functions described above with respect to key 50.

It will be appreciated by those skilled in the art that the depth of the grooves 230–235 and the length of the corresponding drive pins 222 and locking pins 220 are coordinated so that the insertion of the key 50B within the device 10B will align the pin ends 223 with the gap G. Further, it will be appreciated by those skilled in the art that the length of the pins 220 and 222 and the depth of the corresponding grooves 230–235 can be arranged to provide a plurality of unlocking arrangements. Accordingly, the operating key 50B and the device 10B can be designed so that only a specially-designed key, such as key 50B, is capable of actuating the device 10B. Of course, the engagement between the retracted locking pins 220 and the gear 90 retains the pins 220 in their unlocked position until the pins 220 and 222 are again aligned by returning the gear 90 to its original position. Then, the springs 221 force the pins 220 across the gap G, and return the device 10B to its locked condition. (FIG. 24).

Figure 21:
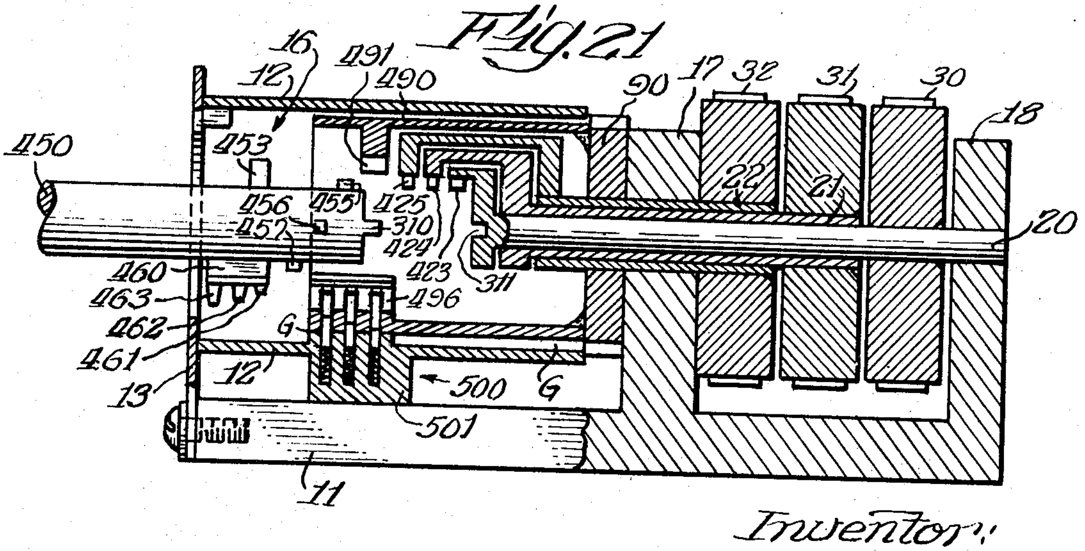
FIG. 21 is an enlarged fragmentary view in section of a fourth embodiment of the key recording device in accordance with this invention.

A fourth embodiment of a key device in accordance with this invention, and an operating key therefor, is illustrated in FIG. 21 of the drawings. In this fourth embodiment, the key device, generally indicated by the reference numeral 400, is adapted to be actuated by a key 450, which has exterior detents 455, 456 and 457 positioned around its outer extremity, in contrast to a tubular key such as the key 50 described above. Again, components of the device 400 which are identical to the components of the previously-described key device 10 are indicated by the same reference numerals.

Referring to FIG. 21 in more detail, the recording device 400 includes a cylindrical housing 12 supported on the frame structure 11 and having a face plate 13, as described above with respect to the device 10. The plate 13 also includes an aperture 15, and the housing 12 defines a hollow key barrel 16 so that the device 400 is adapted to receive the operating key 450. The key shaft 20, the sleeves 21 and 22, and the recording discs 30, 31 and 32 which are mounted between the frame structures 17 and 18, are all constructed in the same manner and perform the same functions as the similar components described above with respect to the device 10. Similarly, the device 400, like the device 10, includes a locking gear 90 which is designed for rotation with the operating key 450. However, in this embodiment the gear 90 is joined to a forwardly-extending cylinder 490 which is mounted within the barrel 16. The cylinder 490 is provided for rotating the gear 90 simultaneously with the rotation of the key 450, and for providing the device 400 with security locking means. The connection between the key 450 and the extension cylinder 490 is accomplished by providing a slot 491 in the upper portion of the cylinder, as shown in FIG. 21, for receiving a spline 453 provided on the key 450. When the spline 453 engages with the slot 491, rotation of the key 450 will simultaneously cause the locking gear 90 to rotate.

Further, the device 400 in accordance with this invention is provided with a series of abutment tabs 423, 424 and 425 which are positioned within the key barrel 16 in a longitudinally spaced relationship. As illustrated in FIG. 21, these tabs 423, 424 and 425 extend transversely with respect to the axis of the barrel 16 and are secured by U-shaped extension arms to the key shaft 20, the sleeve 21 and the sleeve 22, respectively. By this arrangement, the tabs 423–425 are separately joined to the rotatable shafts and the sleeves, and are independently rotatable within the key barrel 16. Accordingly, rotation of the tabs 423–425 by operation of the key 450 will result in a corresponding rotation of the shaft 20, and the sleeves 21 and 22. Similarly, the rotation of the abutment tabs 423, 424 and 425 cause a corresponding rotation of the recording discs 30–32, so as to record indicia corresponding to the position of the respective tabs. By this arrangement, as described hereinabove, the key 450 is adapted to move the tabs 423–425 from their initial positions to selected second positions so that the particular operating key 450 being used to operate the device 400 can be readily identified by the indicia registered by the recording discs 30, 31 and 32.

As seen from FIG. 21, the operating key 450 is dimensioned for insertion within the barrel 16 through the aperture 15 in the face plate 13. Further, the inner end of the key 450 includes projecting detents 455, 456 and 457, and a guide pin 310. The pin 310 engages with a corresponding groove 311 in the key shaft 20 to give the key 450 stability during the operation of the device 400. Further, the detents 455, 456 and 457 on the key 450 are spaced longitudinally along the key so that they are engageable with the projecting tabs 423, 424 and 425, respectively. Moreover, the detents 455, 456 and 457 are positioned around the periphery of the key 450 so that they will operate to move the tabs 423, 424 and 425 into preselected second positions upon the rotation of the key 450 through a predetermined arc. Of course, as will be appreciated by those skilled in the art, these detents 455–457 can be readily positioned at any desired location around the periphery of the key 450 to adapt the key to register a variety of different numerals on the recording discs 30, 31 and 32.

The operation of the device 400 is very similar to the operation of the previously-described device 10. As the key 450 is inserted within the barrel 16, the pin 310 engages with the groove 311 to stabilize the key, and the key is rotated through a predetermined arc. As the key 450 is rotated, the detents 455, 456 and 457 engage with the abutment tabs 423–425 on the device 400 and rotate the printing dials 30, 31 and 32 into predetermined second positions. These positions of the recording dials thus register indicia identifying the key 450. Furthermore, the spline 453 simultaneously engages with the slot 491 in the cylinder 490, and drives the locking gear 90 through the same arc. Of course, suitable means such as a spring or the like is provided to return the dials 30–32 and tabs 423–425 to their original positions when the key is returned to its initial position.

The key device 400 is also provided with security locking means 500 to control access to the product being distributed. In this regard, the frame structure 11 is provided with a boss 501 which includes a plurality of recesses in which locking pins 502 are positioned. Compression springs 503 urge the pins 502 upwardly toward the interior of the barrel housing 16, as illustrated in FIGS. 21 and 25.

In addition, the lower portion of the cylindrical extension 490 of the locking gear 90 is provided with a boss portion 493 which includes a plurality of holes corresponding to the recesses in the boss 501. Each of these holes in the boss 493 includes a drive pin 494 which has an end portion 495 adapted for engagement with the associated locking pin 502. Thus, as illustrated in FIG. 21, the springs 503 urge the locking pins 502 upwardly, to span the gap G between the cylinder 490 and the barrel housing 12. The pins 502 thereby restrain the locking gear 90 and the associated components from rotation by the key 450. This security lock provided by the locking means 500 can be released by depressing the drive pins 494 and the associated locking pins 502 downwardly until the ends of the pins 495 are aligned with the gap "G." Then, the cylinder 490 can be rotated, and will hold the pins 502 in the retracted position until the pins 494 and 502 are again aligned.

To accomplish this release of the locking means 500, the lower portion of the cylinder 490 includes a groove 496 for receiving the key blade 460 which is positioned on the lower portion of the key 450. The key blade 460, including depending projections 461, 462 and 463, can be inserted in the slot 495 to depress the drive pins 494 until the ends thereof are aligned the gap "G," as described above. Then, with the device 400 released from its locked position, the key 450 can be rotated. As will be appreciated by those skilled in the art, the projections 461, 462 and 463 on the blade 460 are coordinated with the length of the drive pins 494 with which they engage to position the ends 495 of the pins 494 in alignment with the gap "G." Of course, the length of the pins 494 and 502, and the height of the projections 461–463 can be varied to provide the operating key 450 with a plurality of security arrangements.

Of course, when the key 450 is returned to align the drive pins 494 with the locking pins 502, the springs 503 will raise the pins 502, and return the device 400 to its locked condition. Accordingly, the device 400 and the associated operating key 450 cooperate to identify the particular operating key being employed, and also provide security locking means which limits the access to the device 400 to authorized customers.

Figure 22:
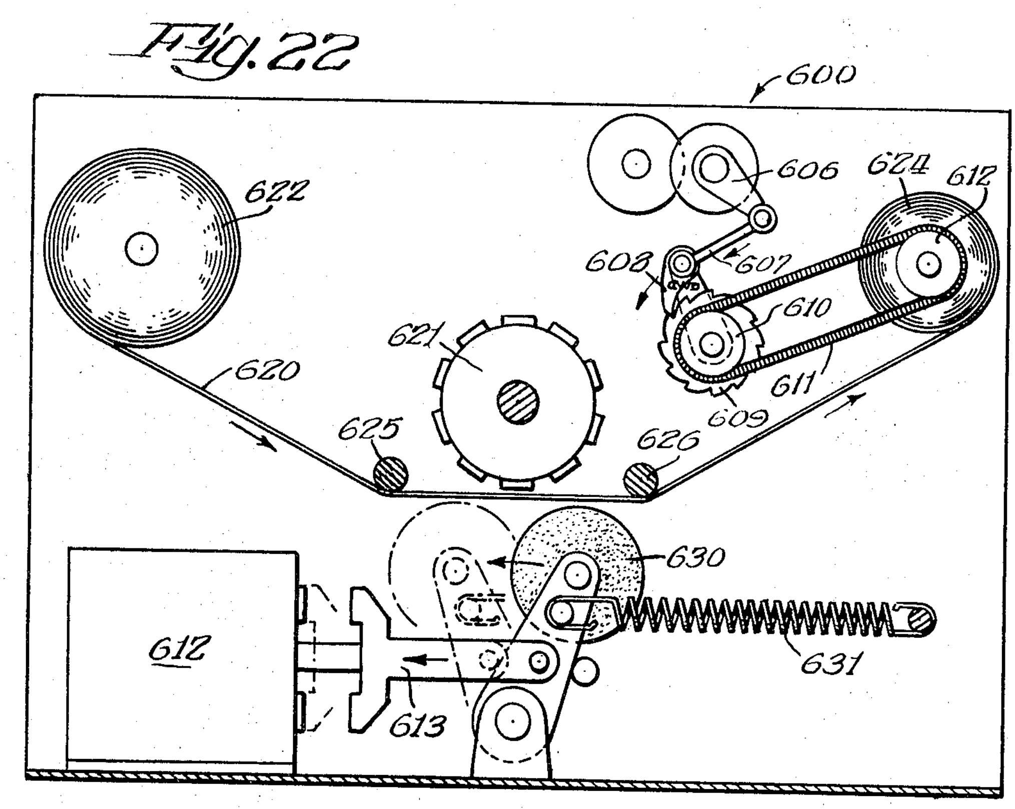
FIG. 22 is an enlarged elevational view in section of an additional form of data recording system which may be incorporated in the key-operated device in accordance with this invention.

A second form of printing system 600, for providing a permanent printed record of the key identifying indicia and the data concerning the amount of product distributed, is illustrated in FIG. 22 of the drawings. In the modified printing system 600 a printing roller 630 has been substituted for the platen 120 included in the previously-described printing system 100 (FIG. 9).

Referring to FIG. 22 in more detail, the system 600 includes a roll of printing tape 620 suspended below a series of recording discs 621 which are arranged in the same manner as the discs 30–32 and 140 shown in FIG. 10. These discs are operative to print indicia identifying the operating key and indicating the volume reading for the product being distributed. Suitable idlers 625 and 626 position the tape 620 in the proper position with respect to the series of recording discs 621. Further, a supply roll 622 provides the system 600 with a continuous supply of tape 620 upon which the key-identifying indicia and distribution data can be printed and a take-up roller 624 is adapted to feed the tape 620 from the supply roller 622 past the discs 621.

The system 600 also includes means to advance the printing tape 620 from the supply roll 622 to the take-up roll 624 after the desired data has been printed thereon. In this regard, a crank arm 606 is secured to an operating shaft 606, which shaft is preferably joined to an operating lever such as the previously-described lever 180 (FIG. 8). The shaft 606 is also preferably joined to the locking disc 304, as illustrated in FIGS. 17–20 so that the above-described interlocking system 300 also controls the movement of the printing tape 620. An eccentric arm 607 is connected to the crack 606, and operates a pawl 608 and ratchet 609. The pawl 608 is spring loaded, and is selectively engageable with the ratchet 609 to rotate a pulley 610. Further, as illustrated in FIG. 22, a belt drive 611 and pulley 612 connect the ratchet 609 with the paper take-up roll 624. Accordingly, when the pawl and ratchet is energized by the crack 606 and eccentric 607, the take-up roll 624 is rotated (counter-clockwise in FIG. 22) and operates to feed the paper stock 620 from the roll 622 onto the take-up roll 624.

The printing system 600 also includes suitable limit switches (not shown) to control the operation of a solenoid 612 for actuating the printing roller 630. The limit switches can be arranged to be activated by the rotation of the shaft 606, or by other suitable devices. As illustrated in FIG. 22, the solenoid 612 is operably connected to the pivoted printing roller member 630 by a ram 613, and the roller 630 is normally biased away from the solenoind by a tension spring 631.

In operation, when the limit switch (not shown) is energized, the solenoid 612 is actuated and retracts the ram 613 against the force of spring 631. This action pivots the printing roller 630 from the position shown in full lines in FIG. 22 to the position shown in phantom lines therein. As the roller 630 pivots, it engages with the printing tape 620 and forces the tape upwardly against the recording discs 621. By such action, an initial reading representing the identification of the operating key employed as well as an initial reading of the amount of product being distributed, is transferred from the discs 621 to the tape 620. When the operation of the distribution system is completed, the shaft 606 is returned to its initial position, and the limit switch (not shown) is de-energized. The solenoid 612 is thereby deactivated and releases the ram 613. As this occurs, the tension spring 631 forcibly returns the pivoted printing roller 630 to its original position, as shown in full lines in 22, and the roller 630 again forces the tape 620 against the printing discs 621. Accordingly, key identifying indicia and the final product distribution data is recorded on the tape 620. The revolution of the shaft 606 operates through a second ratchet and pawl mechanism (not shown), which operates in the reverse direction as the ratchet 608 and pawl 609, to advance the tape 620 onto the take-up roller 624 before this final reading is printed.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. In a key recording device for registering the identification of each of a plurality of operating keys, a housing defining a barrel opening for receiving on operating key, a series of abutment members mounted in a first preselected position in longitudinally spaced relationship with respect to the axis of said barrel opening within said barrel opening with each abutment member being independently rotatable about the axis of said barrel opening within said barrel opening from said first position, an operating key insertable into said barrel and rotatable therein through a predetermined arc from a locked position to an unlocked position, said operating key including a series of pre-arranged longitudinally spaced detents each operably engageable with one of said abutment members within said barrel opening to move said abutment members from said first position to preselected second positions when said key is rotated through said arc from said locked to said unlocked position, and indicia registering means responsive to the rotation of each abutment member to said second position to register indicia corresponding to said second preselected position for each of said abutment members, whereby said registered indicia positively identifies said operating key having said pre-arranged detents which move said abutment members to said second positions when said key is rotated to said unlocked position, and whereby said key detent arrangement may be selectively varied to provide said key lock recording device with a plurality of identifiable operating keys.

2. The invention according to claim 1 wherein said key housing includes stop means to prevent said key from being withdrawn from said barrel opening when said key is rotated out of said locked position.

3. The invention according to claim 1 wherein said registering means comprises an indicia imprinting member operably joined to each of said abutment members and wherein said device includes printing means engageable with said imprinting members to record said indicia corresponding to said second position of each of said abutment members.

4. The invention according to claim 3 wherein said indicia imprinting members comprise recording discs having peripheral printing symbols.

5. In a key recording device for registering the identification of each of a plurality of operating keys, a housing defining a barrel opening for receiving an operating key, a series of transversely extending abutment tabs mounted in longitudinally spaced relationship with respect to the axis of said barrel opening within said barrel opening with each tab being independently rotatable within said opening from a first preselected position to a second preselected position, a hollow operating key insertable into said barrel opening over said tabs and rotatable through a predetermined arc within said barrel from a locked position to an unlocked position, the internal portion of said hollow key including a series of longitudinally spaced detents, each of said detents being pre-arranged within said key for operative engagement with at least one of said abutment tabs within said internal portion of said key to rotate each tab from said first position to said second position when said key is rotated through said arc from said locked to said unlocked position, and indicia registering means responsive to the rotation of each tab to said second position to register indicia corresponding to said second preselected position for each of said abutment tabs, whereby said registered indicia positively identifies said operating key having said pre-arranged detents, and whereby said key detent arrangement may be selectively varied to provide said key lock recording device with a plurality of identifiable operating keys insertable within said barrel opening.

6. A key recording device comprising a housing defining a longitudinal barrel opening for receiving an operating key, a plurality of abutment tabs concentrically mounted within said barrel opening in longitudinally spaced relationship with respect to the axis of said barrel opening and engageable with said operating key, each of said abutment tabs being independently rotatable about the axis of said barrel opening from an initial position to a plurality of second positions within said barrel opening, and indicia registering means connected to said tabs and responsive to the rotation of each of said tabs from said initial position to a preselected second position to register indicia corresponding to said preselected second position for each of said tabs.

7. The invention according to claim 6 wherein said abutment tabs are in longitudinal alignment in said initial position.

8. The invention according to claim 6 wherein said indicia registering means comprises a rotatable recording disc connected to each of said tabs and wherein each of said discs has peripheral printing symbols.

9. The invention according to claim 8 wherein said key recording device includes printing means engageable with said printing symbols on said discs to record indicia corresponding to said second preselected position of each of said abutment tabs.

10. An operating key for use with a key recording device having a plurality of longitudinally spaced and independently rotatable abutment members, said key comprising a handle portion for rotating said key and a hollow body portion for extension over said abutment members of said key recording device, the interior of said hollow body portion of said key including detents arranged for engaging and selectively rotating said abutment members when said key is rotated with said key body portion extended over said abutment members, and retractable cover means biased to shield said detents when said key is not in use.

11. An operating key for use with a key recording device having a plurality of longitudinally spaced and independently rotatable abutment tabs, said key comprising a handle portion for rotating said key and a hollow body portion for extension over said tabs, means dividing the interior of said hollow body portion of said key into a plurality of transverse compartments, each of said compartments being longitudinally spaced with respect to the axis of said key within said interior of said hollow body portion for receiving one of said abutment tabs, and detent means positioned within said spaced compartments of said key body portion for engaging said tabs when said key is rotated with said body portion extended over said tabs, said detents being pre-arranged within said compartments to rotate each of said tabs to a preselected position when said key is rotated through a predetermined arc.

12. In a key recording device for registering the identification of each of a plurality of operating keys, a housing defining a barrel for receiving an operating key, a series of abutment tabs mounted in longitudinally spaced relationship with respect to the axis of said barrel opening within said barrel opening and projecting transversely inwardly toward said barrel axis with each tab being independently rotatable within said opening from a first position to a second preselected position, an operating key insertable into said barrel opening in the direction of said barrel axis and rotatable through a predetermined arc within said barrel from a locked position to an unlocked position, the external portion of said key including a series of longitudinally spaced detents, each of said detents being pre-arranged along the length of said key for operative engagement with at least one of said abutment tabs to rotate each tab from said first position to said second position when said key is rotated through said arc to said locked position, and indicia registering means responsive to the rotation of each tab to said second position to register indicia corresponding to said second preselected position for each of said abutment tabs and thereby positively identifies said operating key.

13. A key recording device comprising a housing defining a longitudinal barrel opening for receiving an operating key, a plurality of abutment tabs mounted within said barrel opening in longitudinally spaced relationship with respect to the axis of said barrel opening and engageable with said operating key, each of said tabs projecting transversely inwardly toward said barrel axis and being independently rotatable from an initial position to a plurality of second positions within said barrel opening, and indicia registering means connected to said tabs and responsive to the rotation of each of said tabs from said initial position to a preselected second position to register indicia corresponding to said preselected second position for each of said tabs.

14. An operating key for use with a key recording device having a plurality of longitudinally spaced and independently rotatable abutment members, said key comprising a handle portion for rotating said key and a longitudinally extending shaft portion adapted for positioning adjacent said abutment members of said key recording device, said key including a series of detents spaced longitudinally along the exterior of said key shaft and fixed in predetermined positions around the periphery of said shaft for engaging and rotating said abutment members through a predetermined arc when said key shaft is rotated.

15. A key recording device in accordance with claim 1 including security locking means adapted to restrain said operating key from rotation within said barrel opening and wherein said locking means includes a retractable tumbler selectively engageable with said operating key to release said locking means and thereby permit rotation of said key within said barrel opening.

16. A key recording device in accordance with claim 15 wherein said locking means comprises a cylindrical lock having a plurality of retractable tumblers projecting transversely toward the axis of said barrel opening and wherein said operating key includes a key blade having projections selectively engageable with said tumblers to retract said tumblers and release said lock as said key is inserted within said housing and thereby permit rotation of said key within said barrel opening.

17. A key recording device in accordance with claim 15 wherein said locking means comprises an axial lock having a plurality of retractable tumblers projecting axially within said barrel opening and wherein the forward end of said operating key includes releasing means selectively engageable with said tumblers as said key is inserted within said barrel opening to axially retract said tumblers and release said lock and thereby permit rotation of said key within said barrel opening.

18. A key recording device in accordance with claim 17 wherein said releasing means on the forward end of said operating key comprises recesses spaced around the periphery of said key and engageable with said tumblers to fully retract said tumblers and release said lock as said key is fully inserted within said barrel opening.

19. The invention in accordance with claim 9 wherein said printing means includes means to feed a sheet of printing stock into position adjacent the printing symbols on said discs and a printing platen operable to selectively force said stock against said printing symbols to record said indicia on said stock.

20. The invention in accordance with claim 9 wherein said printing means includes means to feed a sheet of printing stock into position adjacent the printing symbols on said disc and a printing roller operable to selectively force said stock against said symbols to record said indicia on said stock.

References Cited

UNITED STATES PATENTS

| | | | |
|---|---|---|---|
| Re. 12,374 | 8/1905 | De Vilbiss | 70—433 |
| 797,598 | 8/1905 | Ohmer | 346—52 |
| 494,340 | 3/1893 | Meinke | 70—404 XR |
| 1,037,531 | 9/1912 | Ratcliff | 70—436 |
| 1,358,921 | 11/1920 | Baluta | 70—433 XR |
| 1,376,405 | 5/1921 | Conte | 70—433 |
| 1,826,615 | 10/1931 | Hansen et al. | 70—411 |
| 2,196,194 | 4/1940 | Cooper | 346—53 |
| 3,237,436 | 3/1966 | Williams | 70—363 |

RICHARD E. MOORE, Primary Examiner

R. L. WOLFE, Assistant Examiner

U.S. Cl. X.R.

70—404, 420, 433; 346—54